(12) United States Patent
Gerrese

(10) Patent No.: US 11,808,587 B2
(45) Date of Patent: Nov. 7, 2023

(54) AUTONOMOUS VEHICLE MULTI-MODAL TRIPS

(71) Applicant: GM Cruise Holdings LLC, San Francisco, CA (US)

(72) Inventor: Alexander Willem Gerrese, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 189 days.

(21) Appl. No.: 17/393,659

(22) Filed: Aug. 4, 2021

(65) Prior Publication Data

US 2023/0041155 A1    Feb. 9, 2023

(51) Int. Cl.
| | |
|---|---|
| *G01C 21/34* | (2006.01) |
| *G01C 21/36* | (2006.01) |
| *B60L 58/13* | (2019.01) |
| *G06Q 50/30* | (2012.01) |
| *G06Q 30/0283* | (2023.01) |
| *G06Q 10/02* | (2012.01) |

(52) U.S. Cl.
CPC .......... *G01C 21/3423* (2013.01); *B60L 58/13* (2019.02); *G01C 21/3453* (2013.01); *G01C 21/3617* (2013.01); *G06Q 10/02* (2013.01); *G06Q 30/0284* (2013.01); *G06Q 50/30* (2013.01)

(58) Field of Classification Search
CPC ............ G01C 21/3423; G01C 21/3453; G01C 21/3617; B60L 58/13; B60L 2200/12; B60L 2240/622; B60L 53/64; B60L 53/665; B60L 53/67; B60L 53/68; G06Q 10/02; G06Q 30/0284; G06Q 50/30
USPC ......... 701/533, 483, 453, 11, 447, 445, 421, 701/423, 468, 465, 537, 527, 425, 538, 701/23, 420, 29.3, 1, 410, 532, 2, 408, 701/414
See application file for complete search history.

(56) References Cited

U.S. PATENT DOCUMENTS

| | | | |
|---|---|---|---|
| 2019/0086221 A1* | 3/2019 | Thiyagarajan | ..... G06Q 30/0633 |
| 2020/0273333 A1 | 8/2020 | Elshenawy | |
| 2021/0102814 A1 | 4/2021 | Spielman et al. | |

FOREIGN PATENT DOCUMENTS

WO    WO-2020131550 A1 *    6/2020    ........... G06Q 10/047

* cited by examiner

*Primary Examiner* — Anne Marie Antonucci
*Assistant Examiner* — Jodi Marie Jones
(74) *Attorney, Agent, or Firm* — Akona IP

(57) ABSTRACT

Systems and methods for multi-modal trips. Systems and methods are provided for integrating multiple legs of a trip using different modes of transportation into a single, personalized transportation experience. In particular, systems and methods are provided for integrating multiple modes of transportation, such as an electric scooter ride and an autonomous vehicle ride, into a single trip.

20 Claims, 10 Drawing Sheets

460

AUTONOMOUS VEHICLE MULTI-MODAL TRIPS

FIELD OF THE DISCLOSURE

The present disclosure relates generally to autonomous vehicles (AVs) and to systems and methods for integrating multi-modal trips.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles are often used to provide rides to passengers who remotely request a vehicle for a selected pick up location and destination. However, some cities have started initiatives to ban cars from many main roads in order to promote cleaner forms of transportation such as walking, scootering, and biking. These options also allow people to enjoy the outdoors and more easily navigate dense traffic areas. Thus, many people prefer walking, scootering, and/or biking for certain trips. However, these options are much less capable of efficiently and quickly travelling distances longer than a few miles, and can also be much slower than driving. Thus, travel modes such as scootering and biking are often not viable options for many trips.

SUMMARY

Systems and methods are provided for integrating multiple legs of a trip using different modes of transportation into a single, personalized transportation experience. In particular, systems and methods are provided for integrating multiple modes of transportation, such as an electric scooter ride and an autonomous vehicle ride, into a single trip.

According to one aspect, a method for multi-modal trips in a rideshare application comprises receiving a ride request including a pick-up location, a destination location, and a ride optimization request; generating a plurality of multi-modal trip routes including at least two modes of transportation and a transfer location; identifying a subset of trips from the plurality of multi-modal trip routes that fulfill the ride optimization request; and presenting at least one of the subset of trips via a rideshare application.

In some implementations, generating the plurality of multi-modal trips includes generating multi-modal trips including a plurality of trip legs, and wherein at least one of the plurality of trip legs includes a personal mobility vehicle as one of the two modes of transportation. In some implementations, the at least two modes of transportation include an autonomous vehicle and a personal mobility vehicle, and further comprising tracking a location and a state of charge of the personal mobility vehicle. In some implementations, the method further comprises providing storage and charging for the personal mobility vehicle in the autonomous vehicle. In some implementations, the method further comprises selecting the autonomous vehicle that includes a personal mobility vehicle stored thereon for driving to the pick-up location. In some implementations, the ride optimization request is one of a fastest trip request and a cheapest trip request. In some implementations, the method further comprises generating a price for the at least one of the subset of trips, and wherein presenting the at least one of the subset of trips includes presenting the price.

According to another aspect, a system for multi-modal trips, comprises a central computing system including a routing coordinator configured to: receive a ride request for a multi-modal trip including a pick-up location and a destination location, generate a route from the pick-up location to the destination location including a transfer location and at least two modes of transportation, and select an autonomous vehicle for driving at least a part of the route, wherein the autonomous vehicle is one of the at least two modes of transportation; and an onboard computing system on the autonomous vehicle configured to direct the autonomous vehicle to: pick up a passenger at one of the pick-up location and the transfer location; and drop off the passenger at one of the transfer location and the destination location.

In some implementations, one of the at least two modes of transportation is a personal mobility vehicle. In some implementations, the personal mobility vehicle is one of a scooter, a bicycle, a skateboard, a hoverboard, a onewheel, an electric scooter, an electric bicycle, and an electric skateboard. In some implementations, the system further comprises a battery on the autonomous vehicle, wherein the autonomous vehicle is configured to provide charge from the battery to the personal mobility vehicle. In some implementations, when the autonomous vehicle picks up the passenger at the pick-up location, the routing coordinator is further configured to select an autonomous vehicle with the personal mobility vehicle stored thereon. In some implementations, the routing coordinator is further configured to receive an optimization request with the ride request and identify the route that fulfills the optimization request.

According to another aspect, a method for multi-modal trips in a rideshare application comprises receiving a ride request including a pick-up location and a pick-up transportation mode, a transfer location and a transfer transportation mode, and a destination location; picking up a passenger at one of the pick-up location and the transfer location; and dropping off the passenger at one of the transfer location and the destination location; wherein the pick-up transportation mode is different from the transfer transportation mode.

In some implementations, picking up the passenger at the pick-up location includes picking up the passenger in an autonomous vehicle that includes a personal mobility vehicle stored thereon. In some implementations, dropping off the passenger includes dropping off the passenger and the personal mobility vehicle. In some implementations, receiving the pickup transportation mode and the transfer transportation mode includes receiving a request for a personal mobility vehicle. In some implementations, the method further comprises tracking, at a central computing system, a location of the personal mobility vehicle and a level of charge of the personal mobility vehicle. In some implementations, the method further comprises generating a route including the pick-up location, the transfer location, and the destination location. In some implementations, the method further comprises generating a price for the route, and presenting the route and the price in the rideshare application.

According to another aspect, a system for providing multi-modal trips in an autonomous vehicle fleet comprises a plurality of autonomous vehicles, a plurality of personal mobility vehicles, and a central computer in communication with the plurality of autonomous vehicles, comprising a routing coordinator configured to receive a ride request for a multi-modal trip including a pick-up location and a destination location, generate a route from the pick-up location to the destination location including a transfer location and at least two modes of transportation, select an autonomous vehicle for driving at least a first part of the route, wherein the autonomous vehicle is one of the at least two modes of transportation, and select a personal mobility vehicle for driving at least a second part of the route, wherein the personal mobility vehicle is one of the at least two modes of transportation.

In some implementations, the system further comprises an onboard computing system on the autonomous vehicle configured to direct the autonomous vehicle to: pick up a passenger at one of the pick-up location and the transfer location; and drop off the passenger at one of the transfer location and the destination location.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
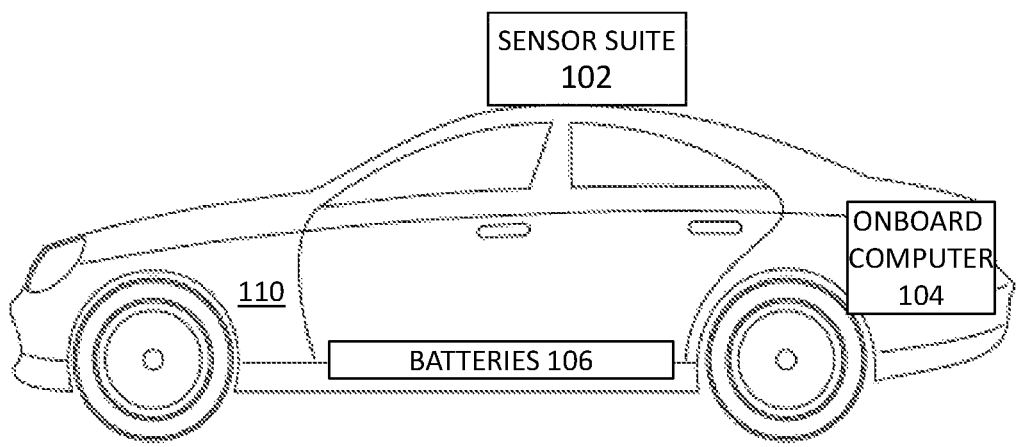
FIG. 1 is a diagram illustrating an autonomous vehicle, according to some embodiments of the disclosure.

Systems and methods are provided for integrating multi-modal trips into a single, personalized transportation experience. In particular, systems and methods are provided for integrating multiple modes of transportation, such as an electric scooter ride and an autonomous vehicle ride, into a single trip.

Public transportation is very costly for cities and often inefficient for users. Public transportation cannot provide door-to-door trips. Additionally, with the aftermath of the COVID-19 pandemic, many people prefer more personalized (and less crowded) transportation options. Thus, many people are opting for more efficient transportation options over public transportation. While rideshare services are great for door-to-door transportation, rideshare services are also much more expensive than other options and increase traffic congestion. Rideshare services are also generally detrimental to the environment, in part due to their personalized nature.

Autonomous vehicles help solve the cost issues presented by other forms of transportation by removing the costliest component (the driver). Additionally, autonomous vehicle help solve the environmental issues presented by other forms of transportation by being all-electric. However, traffic congestion is still an issue even with autonomous vehicles. And, many passengers will continue to prefer to travel alone or in smaller groups.

More eco-friendly, outdoor modes of transportation, such as biking, scootering, and walking, are gaining in popularity. In fact, many large cities, including Copenhagen, Paris, and San Francisco, have started initiatives to ban cars from many main roads in order to promote cleaner forms of transportation. Eco-friendly transportation options allow people to enjoy the outdoors and navigate denser areas of traffic with ease, especially for last mile scenarios. However, these options are much less capable of efficiently achieving longer distances (e.g., more than a few miles).

One solution is to mix and match various modes of transportation that have complementary use cases. However, this can be difficult for several reasons. First, availability of last-mile transportation options such as scooters and bikes is not guaranteed due to the option for users to leave these items anywhere, and with any amount of remaining charge. Second, coordinating between rideshare and scootering and/or biking can be very difficult, requiring manual research to plan. The handoff is poor because the bike and/or scooter cannot be put in or on a typical rideshare vehicle. Third, with two or more different pricing structures and base fees, using two or more modes of transportation likely costs more than using one.

Systems and methods are provided herein for seamlessly integrating multiple modes of transportation into a single rideshare experience. In one example, an autonomous vehicle can be equipped to carry a scooter, allowing a user to stop at a selected location and continue their trip on the scooter. In other examples, a user begins a trip on a scooter, meets the autonomous vehicle at a pick-up location, puts the scooter in/on the autonomous vehicle, and continues the trip in the autonomous vehicle. In another example, an autonomous vehicle can be equipped to carry a bicycle, allowing a user to stop at a selected location and continue their trip on the bicycle. In some examples, the scooter and/or bicycle can be electric, and the scooter and/or bicycle can be recharged via the autonomous vehicle. Many different variations of multi-modal trips are possible. Using a multi-modal trip implementation, a user can select multiple modes of transportation for a single trip, all within a single rideshare system.

Example Autonomous Vehicle Configured for Multi-Modal Trips

FIG. 1 is a diagram 100 illustrating an autonomous vehicle 110, according to some embodiments of the disclosure. The autonomous vehicle 110 includes a sensor suite 102, an onboard computer 104, and batteries 106. In various implementations, the autonomous vehicle 110 uses sensor information from the sensor suite 102 to determine its location, to navigate traffic, and to sense and avoid obstacles. According to various implementations, the autonomous vehicle 110 is part of a fleet of vehicles for picking up passengers and/or packages and driving to selected destinations. According to various examples, the autonomous vehicle 110 includes a storage space for a scooter and/or bike, such as trunk space and/or a bike/scooter rack.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events, and update a high fidelity map. In particular, data from the sensor suite can be used to update a map with information used to develop layers with waypoints identifying selected events, the locations of the encountered events, and the frequency with which the events are encountered at the identified location. In some examples, the presence and location of open parking spaces is detected and this information is recorded in a mapping system. In this way, sensor suite 102 data from many autonomous vehicles can continually provide feedback to the mapping system and the high fidelity map can be updated as more and more information is gathered.

The sensor suite 102 includes a plurality of sensors, and is coupled to the onboard computer 104, and the batteries 106. In some examples, the onboard computer 104 receives data captured by the sensor suite 102 and utilizes the data received from the sensors suite 102 in controlling operation of the autonomous vehicle 110. In some examples, one or more sensors in the sensor suite 102 are coupled to the batteries 106, and capture information regarding a state of charge of the batteries 106 and/or a state of health of the batteries 106. The batteries 106 are used for operation of the autonomous vehicle, for example to power the vehicle and to start the vehicle. In some implementations, the autonomous vehicle is an electric vehicle, and the batteries 106 provide power for movement of the vehicle among other operations of the vehicle. Furthermore, the batteries 106 power components of the autonomous vehicle including the sensor suite 102 and the onboard computer 104. In some implementations, the batteries 106 provide charge to the storage space, and the autonomous vehicle 110 is configured such that the batteries 106 can be used to recharge an electric scooter, bicycle, and/or other electric transportation mode.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. In some examples, the interior sensors can be used to detect passenger belongings left inside the vehicle. Based upon the vehicle state and programmed instructions, the onboard computer 104 controls and/or modifies driving behavior of the autonomous vehicle 110.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences. In some examples, a passenger requests that the autonomous vehicle 110 modify its route to add a selected intermediate stop.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Method for Multi-Modal Trips

Figure 2:
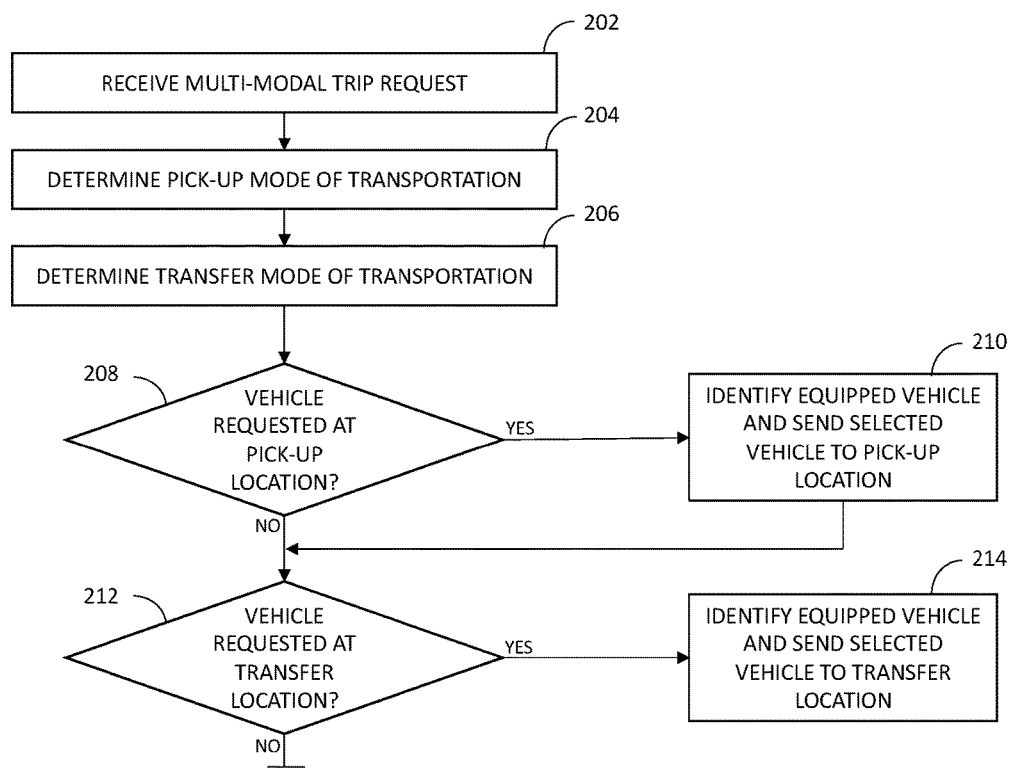
FIG. 2 is a diagram illustrating a method for multi-modal trips, according to some embodiments of the disclosure.

FIG. 2 is a diagram illustrating a method 200 for multi-modal trips, according to various embodiments of the disclosure. The method generates a trip including multiple modes of transportation for a single price. At step 202, a multi-modal trip request is received. The request includes a pick-up location, a transfer location, and a final destination location. The transfer location is the location where the user requests to switch from a first mode of transportation to a second mode of transportation.

At step 204, a pick-up mode of transportation is determined. In particular, a user submits a selected pick-up transportation mode, such as a driverless car, a driverless van, another autonomous vehicle, or a personal mobility vehicle such as an electric scoter or an electric bicycle. In some examples, the user can select whether the user prefers an individual ride or a rideshare with other passengers. At step 206, a transfer mode of transportation is determined. In particular, the user submits a selected transfer transportation mode—the selected transportation mode for the second leg of the trip. Similar to the pick-up transportation mode, various options include an autonomous vehicle such as a driverless car or a driverless van, or a personal mobility vehicle such as an electric scooter or an electric bicycle.

At step 208, whether a vehicle is requested at the pick-up location is determined. In some examples, the user may have a first vehicle already available. For example, if the pick-up mode of transportation is an electric scooter, the user may have an electric scooter available nearby. For instance, another user may have left a scooter near the pick-up location. Similarly, in another example, if the pick-up mode of transportation is an electric bicycle, the user may have an electric bicycle available nearby. In some examples, there is a bike-rack with electric bikes (and/or a scooter rack with electric scooters), and the user plans to take a bike or scooter from the rack. In this case, a bike or scooter can be reserved for the user through the rideshare interface. If no vehicle is needed at the pick-up location, the method 200 proceeds to step 212.

At step 208, if a vehicle is requested at the pick-up location, the method proceeds to step 210, appropriately equipped autonomous vehicles are identified, and one of the identified autonomous vehicles is selected and routed to the pick-up location. In one example, the pick-up mode of transportation is a driverless car, and the transfer mode of transportation is an electric scooter. Thus, in this example, an appropriately equipped autonomous vehicle is a driverless car that is carrying an electric scooter with enough charge to reach the destination location. Driverless cars that fit this description are identified, and one of the identified driverless cars is selected and sent to the pick-up location. In another example, the pick-up mode of transportation is an electric scooter, and an electric scooter is requested to be delivered to the pick-up location. In this example, another vehicle, such as a driverless van, driverless car, or another driverless delivery vehicle, drives to the pick-up location and delivers the electric scooter. The vehicle that delivers the electric scooter may deliver the electric scooter en route to another destination. The user retrieves the electric scooter from the delivery vehicle and begins their trip. In other examples, other modes of transportation are selected.

In some implementations, at step 208, an autonomous vehicle that is not appropriately equipped for the second leg of the journey is selected, and the additional mode of transportation is transferred to the selected vehicle during the ride. In general, this may occur in order to optimize for speed if an appropriately equipped vehicle is not readily available. For example, in a trip that includes a driverless car and a transfer to an electric scooter, a driverless car without an electric scooter is selected in order to optimize for speed of arrival of the driverless car at the pick-up location. In some examples, the rideshare routing system is used to identify a place where another autonomous vehicle having a scooter on board can dock to the driverless car and initiate a transfer of the scooter to the driverless car. In some examples, an autonomous vehicle can dock with another autonomous vehicle while moving. Thus, in this manner, no time is lost in matching a user with a driverless car with specific parameters, and the request for the scooter is still fulfilled.

The method 200 proceeds to step 212, where it is determined whether a vehicle is requested at the transfer location. In some examples, the pick-up mode of transportation may be equipped with the transfer mode of transportation. For example, if the pick-up mode of transportation is a driverless car and the transfer mode of transportation is an electric scooter, at step 210, a driverless car that is carrying an electric scooter is selected. Thus, no additional vehicle is needed at the transfer location. If no additional vehicle is requested at the transfer location, the method 200 ends. In another example, the pick-up mode of transportation is an electric scooter, and the transfer mode of transportation is a driverless car or van. In this example, a driverless car or van is requested at the transfer location. If a vehicle is requested at the transfer location, the method proceeds to step 214.

At step 214, appropriately equipped autonomous vehicles are identified, and one of the identified autonomous vehicles is selected and routed to the transfer location. In the example in which the pick-up mode of transportation is an electric scooter, and the transfer mode of transportation is a driverless car, driverless cars that can carry an electric scooter are identified, and one of the identified driverless cars is selected and sent to the transfer location. In various examples, the identified driverless car is selected when the ride request is received, and the driverless car is scheduled to arrive at the transfer location at a selected time.

In one example, the pick-up mode of transportation is a driverless car, and the transfer mode of transportation is an electric scooter. Thus, in this example, an appropriately equipped autonomous vehicle is a driverless car that is carrying an electric scooter with enough charge to reach the destination location. Driverless cars that fit this description are identified, and one of the identified driverless cars is selected and sent to the pick-up location. In another example, the pick-up mode of transportation is an electric scooter, and an electric scooter is requested to be delivered to the pick-up location. In this example, another vehicle, such as a driverless van, driverless car, or another driverless delivery vehicle, drives to the pick-up location and delivers the electric scooter. The vehicle that delivers the electric scooter may deliver the electric scooter en route to another destination. The user retrieves the electric scooter from the delivery vehicle and begins their trip. In other examples, other modes of transportation are selected.

In various implementations, the multi-modal trip includes at least two different modes of transportation integrated into a single ride request and provided for a single price for the entire trip. In some examples, the price for the trip can be adjusted to provide incentives for users to fix imbalances in an autonomous vehicle fleet. Similarly, the price for the trip can be adjusted to provide incentives for users to fix imbalances in a personal mobility vehicle fleet. Additionally, incentives can be provided for users to return personal mobility vehicles to charging hubs and/or to autonomous vehicles.

In some implementations, the trip request does not include a request for multi-modal transportation, but the user decides during the trip to change transportation modes. In one example, a user is riding in an autonomous vehicle, and, before reaching the destination, the user decides to exit the vehicle and continue the trip on a scooter that is currently in (or on) the vehicle. For example, if the driverless vehicle is stuck in traffic, a passenger may decide to take a scooter and exit the vehicle. In this example, the user can take the scooter without any additional interaction with the rideshare application. The rideshare service already has a user identity for the passenger, and sensors can detect removal of the scooter by the user. The rideshare service adds the scooter usage to the user's account. Thus, a user can make a spontaneous decision to switch transportation modes, and the switch occurs seamlessly, without any interaction with the rideshare service or rideshare interface. In various examples, a user can switch from a driverless vehicle to any type of personal mobility vehicle.

In some implementations, the trip request does not include a request for multi-modal transportation, and the user decides after the trip (upon reaching the destination) to continue on with another transportation mode. In some examples, a user riding in a driverless car reaches the destination location, and when exiting the vehicle, the user takes a personal mobility vehicle. For example, the user takes a scooter when exiting the vehicle. The user can take the scooter without any extra interaction with the rideshare application. The rideshare service already has a user identity for the passenger, and sensors can detect removal of the scooter by the user. Thus, a user can make a spontaneous decision to continue the trip with another transportation mode, and the personal mobility vehicle is immediately available, without any interaction with the rideshare service or rideshare interface.

Example Method for Optimized Trip

Figure 3:
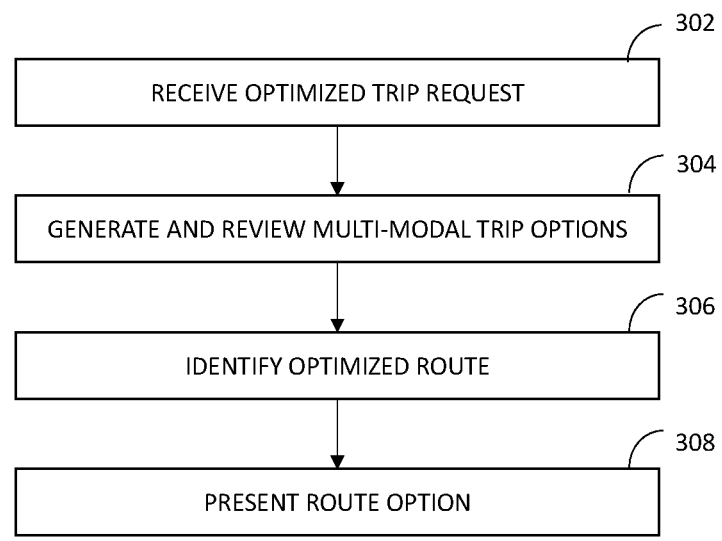
FIG. 3 is a diagram illustrating a method for optimizing a trip, according to various embodiments of the disclosure.

FIG. 3 is a diagram illustrating a method 300 for optimizing a trip, according to various embodiments of the disclosure. In various examples, a trip can be optimized for time (fastest route), price (cheapest route), and/or to include a preferred mode of transportation. Thus, a user's trip can be dynamically routed based on their preferences. In some examples, user preferences can be set in the rideshare application and can then be updated for any individual trip.

At step 302, an optimized trip request is received. In some examples, the optimized trip request is a specific request for a specific trip. In other examples, the optimized trip request is generated based on a user default preference for any trip request. At step 304, various multi-modal trip options are reviewed. In particular, a central computing system reviews multi-modal trip options when an optimized trip request including a pick-up location and a drop-off location is received. At step 306, an optimized route is identified. At step 308, the identified optimized route is presented to the user, along with a price for the route. The user can then accept or reject the identified route. In some examples, multiple route options are presented to the user, such that the user can select a preferred route and/or mode(s) of transportation. For instance, a user who generally prefers eco-friendly transportation modes including personal mobility vehicles like scooters and bicycles may choose to avoid these modes of transportation on an especially hot or cold day, or if travelling to a formal event.

In one example, a user requests a trip optimized for speed, such that the user arrives at the destination location as soon as possible. For example, a trip to work in the morning can include a fast highway portion with a slow down due to traffic congestion closer to the destination. Thus, an optimized route is generated that includes a driverless car ride for the first fifteen miles and an electric scooter ride for the last mile, saving fifteen minutes sitting in traffic in the car. The central computing system identifies a transfer location where the driverless car pulls over and directs the passenger to pick up a scooter from the back and ride the scooter the last mile to the final destination.

In another example, a user requests a trip optimized for cost. That is, the user would like the least expensive trip option. In this instance, the user may be routed to a nearby scooter charging/pick-up hub that is a few minutes away on foot. From the scooter pick-up hub, the user is directed to ride to a designated rideshare route pick-up location. The rideshare route is a fixed, low-cost, route that runs frequently and may include multiple passengers in a single driverless car or van. The user waits at the designated pick-up location and waits for the next rideshare vehicle. The user can then board the rideshare vehicle with the scooter. In some examples, the rideshare vehicle is boarded like a bus, and the rideshare vehicle can be a bus, a van, a car, or another vehicle. In some examples, the scooter can be charged in the rideshare vehicle on the way to the user's stop. The user exits the rideshare vehicle at a designated exit stop and then rides the electric scooter to a scooter hub near the final destination. The user parks the scooter in the scooter hub and walks the remaining few minutes to the final destination.

In another example, a user wants to scooter to a selected location, but it is not reasonable to scooter back home again. For instance, a user may want to scooter to the grocery store, but cannot scooter back with the grocery bags. If there is no scooter hub near the user's home, a nearby driverless vehicle stops in front of the user's house to deliver a charged scooter. The user rides the scooter to the store, and when the user is done at the store, a driverless vehicle is waiting outside. The user places their purchases inside the driverless vehicle, and places the scooter in a selected scooter storage space. The driverless vehicle drives the user to the user's destination where the user unloads the items but leaves the scooter inside the driverless vehicle, where it can charge and be used by another user.

Example of Autonomous Vehicle for Multi-Modal Trips

Figure 4A:
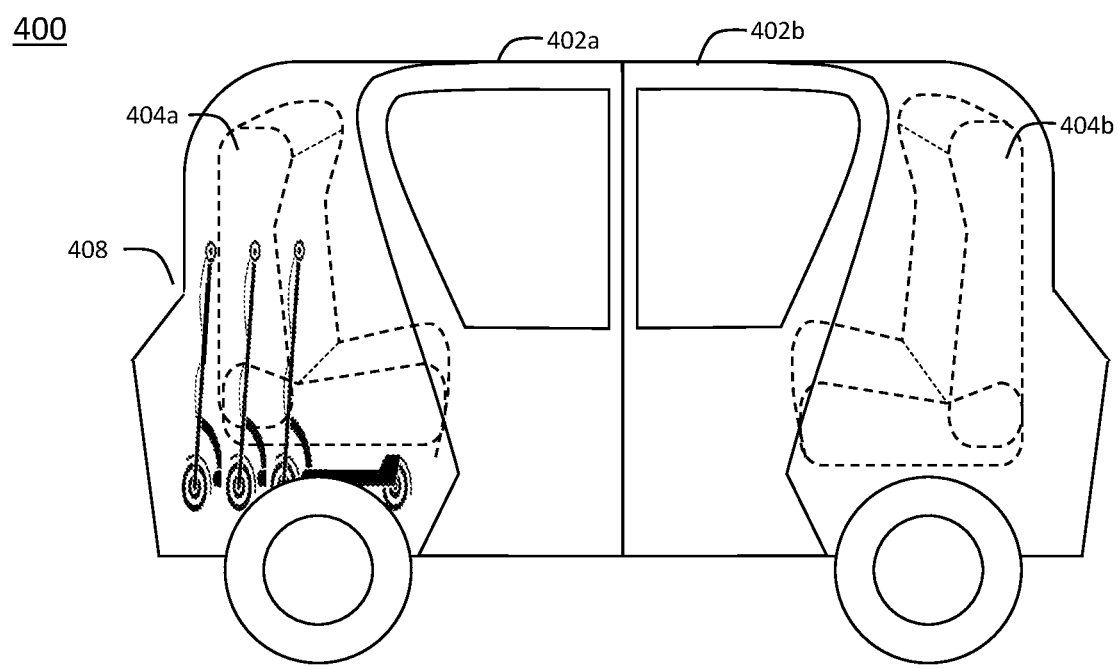
FIGS. 4A-4D are diagrams illustrating various autonomous vehicles configured for multi-modal trips, according to some embodiments of the disclosure.

FIGS. 4A-4D are diagrams illustrating various autonomous vehicles 400, 420, 440, 460 configured for multi-modal trips, according to some embodiments of the disclosure. As shown in FIG. 4A, the autonomous vehicle 400 includes passenger seating 404a, 404b as well as a storage area 408 for personal mobility vehicles next to one of the passenger seats 404a. In some implementations, the storage area 408 is configured to charge personal mobility vehicles such as electric scooters stored there. In one example, the storage area 408 wirelessly charges the personal mobility vehicles. In some examples, the storage area is configured to store other personal mobility vehicles such as scooters, bicycles, skateboards, hoverboards, onewheels, or other vehicles. A user enters the autonomous vehicle 400 through the doors 402a, 402b, and, if the user has a scooter or other vehicle, the user can place it in the storage area 408. When the user disembarks from the autonomous vehicle 400, the user can leave the scooter in the storage area 408, or take the scooter with them.

Figure 4B:
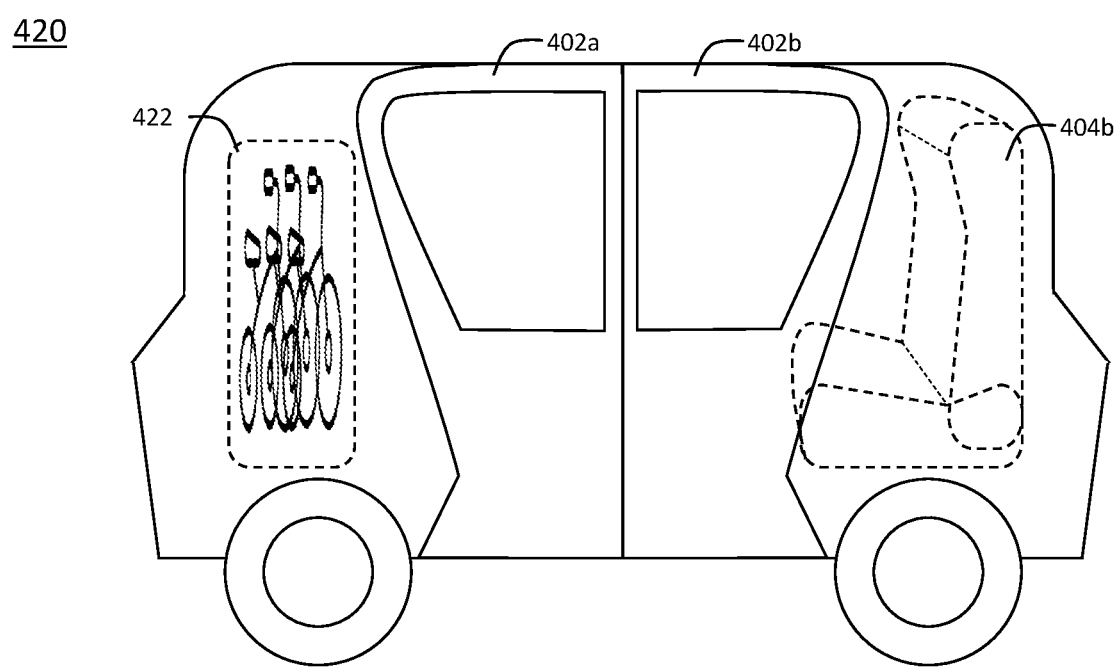

FIG. 4B shows an autonomous vehicle 420 including passenger seating 404b on one side and personal mobility vehicle storage 422 on the other side. As shown in FIG. 4B, the personal mobility vehicle storage area 422 is large enough to store multiple bicycles. The personal mobility vehicle storage area 422 is configured to charge electric vehicles stored therein. In some examples, the personal mobility vehicle storage area 422 wirelessly charges electric vehicles stored therein. In various examples, different types of electric vehicles can be stored in the personal mobility vehicle storage area 422. Passengers can take an electric vehicle for use when exiting the autonomous vehicle. For instance, passengers can check out an electric vehicle from the personal mobility vehicle storage area 422 through the rideshare application. Additionally, the personal mobility vehicle storage area 422 can be used to store personal electric vehicles for delivery to users who choose to use a personal electric vehicle for one or more legs of a trip. In some examples, the personal mobility vehicle storage area 422 is accessible through an additional trunk door on the rear of the vehicle.

Figure 4C:
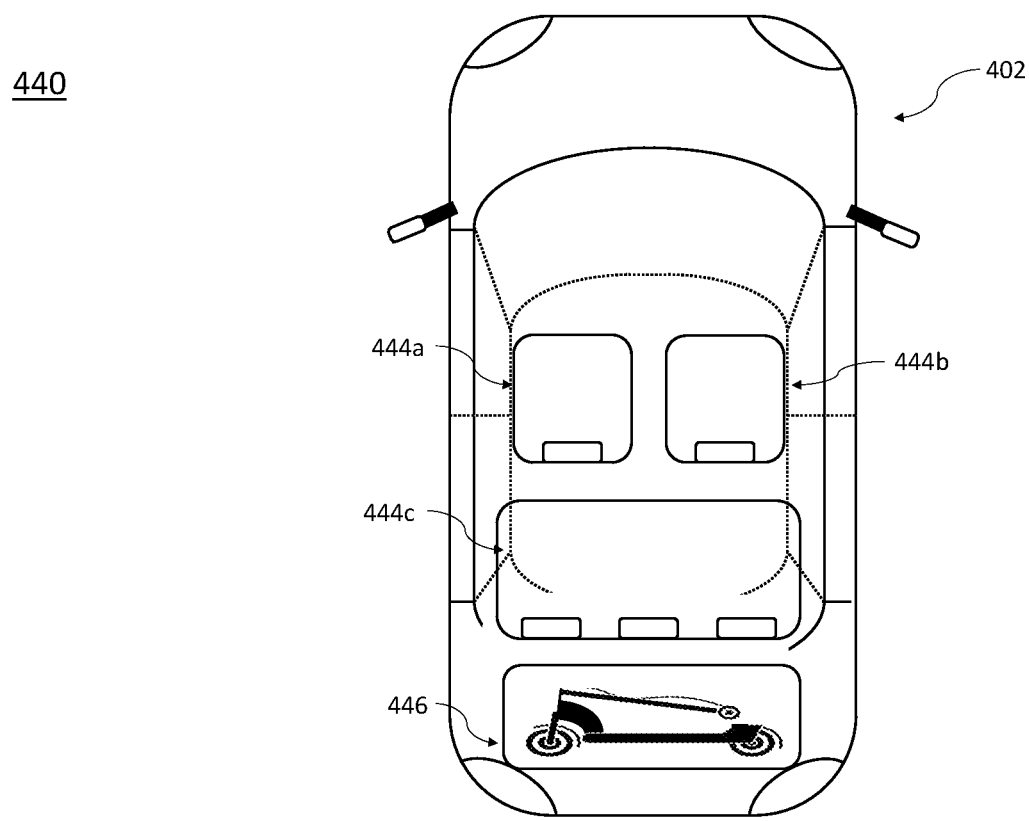

FIG. 4C shows an autonomous vehicle 440 including passenger seating 444a, 444b, and 444c and trunk storage space 446. The trunk storage space 446 is large enough to store multiple personal mobility vehicles such as electric scooters. In the vehicle 440 shown in FIG. 4C, an electric scooter is folded, such that the handlebars are folded downward toward the riding platform, and stored in the trunk storage space 446. In various examples, multiple folded scooters can be stored in the trunk storage space 446. In some examples, folding bicycles can also be stored in the trunk storage space 446. In further examples, skateboards, hoverboards, onewheels, and other personal mobility vehicles can also be stored in the trunk storage space 446. The electric vehicle storage area 446 is configured to charge electric personal mobility vehicles stored therein. In some examples, the electric personal mobility vehicle storage area 446 wirelessly charges electric vehicles stored therein.

Figure 4D:
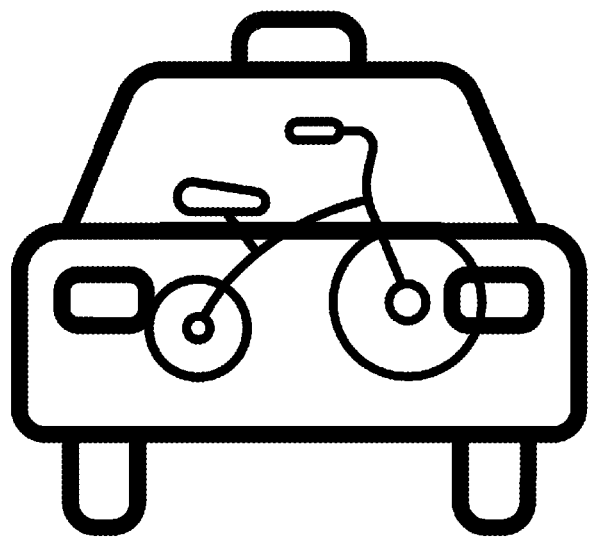

FIG. 4D shows an autonomous vehicle 460 including a bicycle stored on a bicycle rack attached to the rear of the autonomous vehicle 460. In various implementations, multiple electric bicycles can be stored on the bicycle rank. In some examples, other types of personal mobility vehicles, such as scooters, can also be stored on the bicycle rack. The bicycle rack is configured to charge electric personal mobility vehicles stored thereon, using charge from the autonomous vehicle battery.

Example Device for Requesting Multi-Modal Trips

Figure 5A:
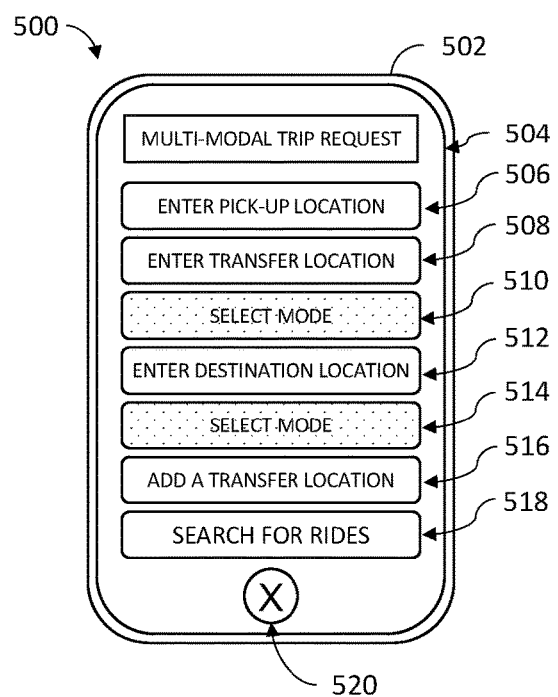
FIGS. 5A-5B show examples of a mobile device interface, according to some embodiments of the disclosure.
Figure 5B:
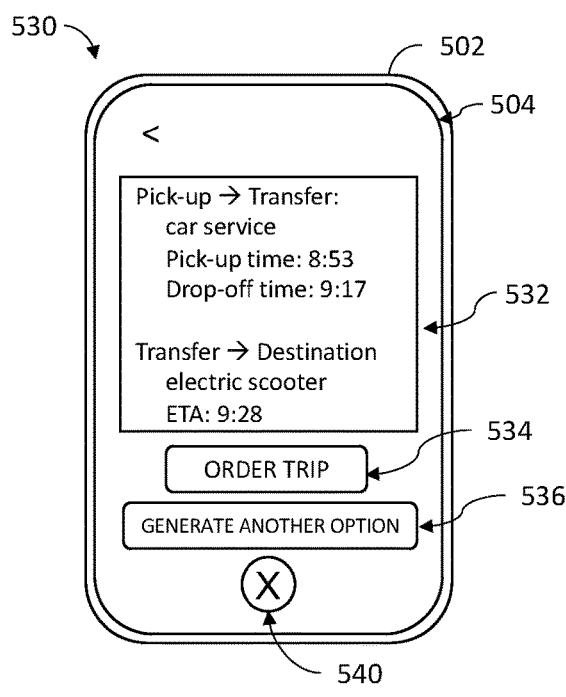

FIGS. 5A and 5B show examples 500, 530 of a device interface multi-modal trips, according to some embodiments of the disclosure. In particular, FIG. 5A shows an example 500 of a device 502 showing a rideshare application interface 504 for requesting multi-modal trips. In some examples, the interface is displayed after a user has selected a multi-modal trip request button on a previous screen. In other examples, a user has a default setting to generate optimized ride options, and the interface 504 is not presented to the user. According to various examples, the device shown in FIGS. 5A and 5B can be any mobile device.

The interface 504 provides a user with a box 506 to enter a pick-up location. The pick-up location can be a saved location such as "home" or "work", or the user can enter a specific address or restaurant/store name. The next box 508 provides a user with a space to enter a transfer location. The next box 510 provides a drop-down menu for the user to select a mode of transportation for travel from the pick-up location to the transfer location. Various modes of transportation that may be offered to the user include, but are not limited to, private driverless car, shared driverless car (or van), electric scooter, and electric bicycle. In some examples, the user enters the transfer location in the box 508 before the user selects the transportation mode 510 between the pick-up location and the transfer location, as some modes of transportation may not be available depending on the trip. In some examples, the user leaves the transportation mode option 510 empty and allows the rideshare application to recommend and/or select a transportation mode according to a preference, such as fastest trip or least expensive trip.

The next box 512 provides a user with a space to enter a destination location. The box 514 provides a drop-down menu for the user to select a mode of transportation for travel from the transfer location to the destination location. Various modes of transportation that may be offered to the user include, but are not limited to, private driverless car, shared driverless car (or van), electric scooter, and electric bicycle. In some examples, the user enters the destination location in the box 512 before the user selects the second transportation mode 514 between the transfer location and the destination location, as some modes of transportation may not be available depending on the trip. In some examples, as described above, the user leaves the transportation mode option 514 empty and allows the rideshare application to recommend and/or select a transportation mode according to a preference, such as fastest trip or least expensive trip.

In some examples, the user has an option of adding additional transfer locations by selecting the button 516. Once the user has entered all the relevant destinations and selected transportation modes, the user can search for rides by selecting the button 518. If the user decides not to order a multi-modal trip, the user can push the "x" button 520 to close out of the multi-modal trip interface 504.

FIG. 5B shows an example 530 of the device 502 showing an identified route option 532. A user can accept the identified route option 532 by selecting the button 534 to order the trip. In some examples, a user can ask the rideshare service to generate a different trip option, by selecting the button 536. Alternatively, the button 540 can be used to close out of the multi-modal trip request interface. The back arrow can be used to go back to the previous interface and change the trip parameters.

The interface 504 shows one option for generating multi-modal trips. In other implementations, an interface includes a pick-up location, a destination location, and an option to generate a multi-modal trip to optimize total time to destination or to optimize for cheapest option.

Example of Autonomous Vehicle Fleet

Figure 6:
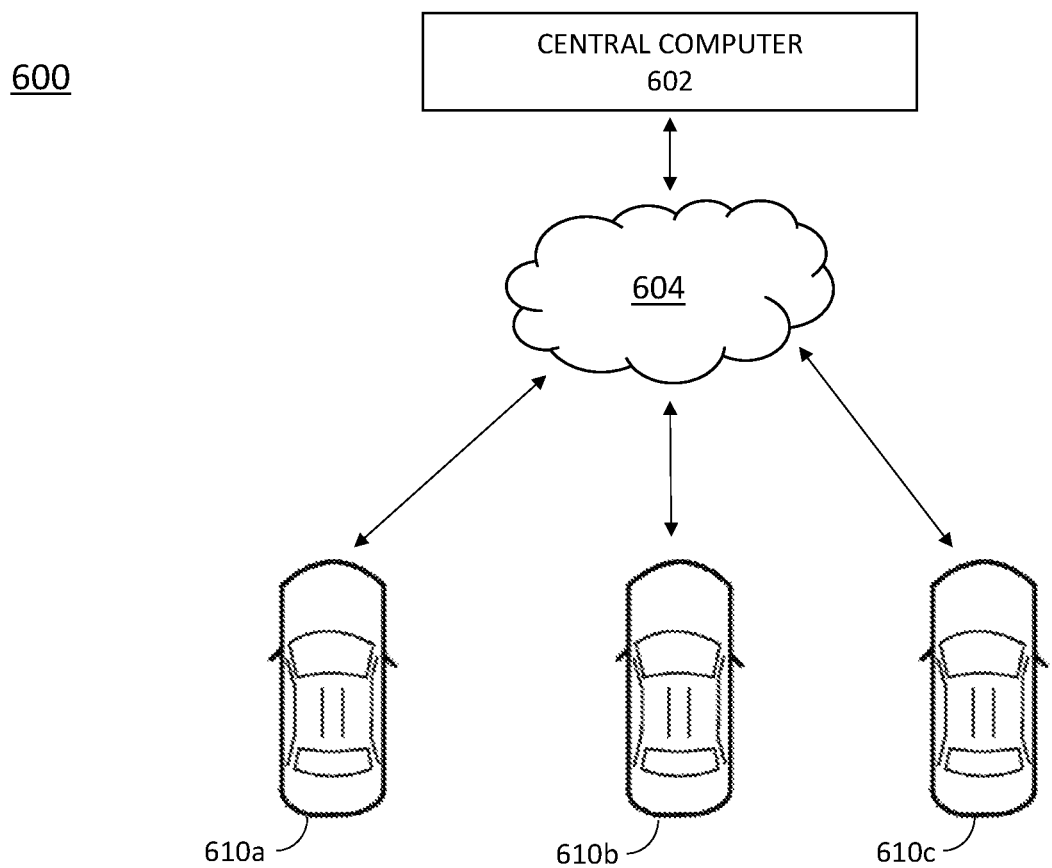
FIG. 6 is a diagram illustrating a fleet of autonomous vehicles in communication with a central computer, according to some embodiments of the disclosure.

FIG. 6 is a diagram illustrating a fleet of autonomous vehicles 610a-610c in communication with a central computer 602, according to some embodiments of the disclosure. As shown in FIG. 6, the vehicles 610a-610c communicate wirelessly with a cloud 604 and a central computer 602. The central computer 602 includes a routing coordinator and a database of information from the vehicles 610a-610c in the fleet. Autonomous vehicle fleet routing refers to the routing of multiple vehicles in a fleet. In some implementations, autonomous vehicles communicate directly with each other. In some implementations, a fleet of electric scooters, electric bicycles, and/or other electric vehicles is in communication with the cloud 604 and the central computer 602. The central computer 602 keeps track of the location of the various electric vehicles, as well as the state of charge of each vehicle.

When a ride request is received from a passenger, the routing coordinator selects an autonomous vehicle 610a-610c to fulfill the ride request, and generates a route for the autonomous vehicle 610a-610c. Additionally, as discussed above, for a multi-modal ride request, the routing coordinator selects an additional vehicle, such as an electric scooter, electric bicycle, or other additional vehicle to fulfill a portion of the ride. In some examples, the generated route includes a route from the autonomous vehicle's present location to the pick-up location, and a route from the pick-up location to the transfer destination. In some examples, the generated route includes a route from the autonomous vehicle's present location to the transfer location, and a route from the transfer location to the final destination. In some examples, the ride request includes a stop request and the generated route includes a route to the stop location.

The generated route can be updated while the vehicle is on the route. In some examples, an intermediate stop request is received after a passenger has been picked up. The generated route is updated to include the intermediate stop, as well as to include autonomous vehicle routing instructions during the stop. Similarly, a transfer request can be received after a passenger has been picked up. The generated route is updated to include a transfer location where the passenger will be dropped off to continue on the route with a different mode of transportation.

Each vehicle 610a-610c in the fleet of vehicles communicates with a routing coordinator. Information gathered by various autonomous vehicles 610a-610c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals.

According to various implementations, a set of parameters can be established that determine which metrics are considered (and to what extent) in determining routes or route modifications. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In another example, a routing goal includes on time pick up of a passenger at the end of an intermediate stop.

Routing goals may be specific: or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goad, it may be acceptable to make some decisions that do not optimize for the goal in the short term, but may aid the goal in the long term). Likewise, routing vehicle specificity may also affect how the goals evaluated; e.g., decisions not optimizing for a goal may be acceptable for some vehicles if the decisions aid optimization of the goal across an entire feet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals takes priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination and/or any intermediate stop. Similarly, in some examples, during an intermediate stop, the onboard computer determines whether the autonomous vehicle parks or continues to drive and circles back to the pick-up location. In some implementations, the routing coordinator in the central computing system 602 generates a route for each selected autonomous vehicle 610a-610c, and the routing coordinator determines a route for the autonomous vehicle 610a-610c to travel from the autonomous vehicle's current location to a first intermediate stop.

Example of a Computing System for Ride Requests

Figure 7:
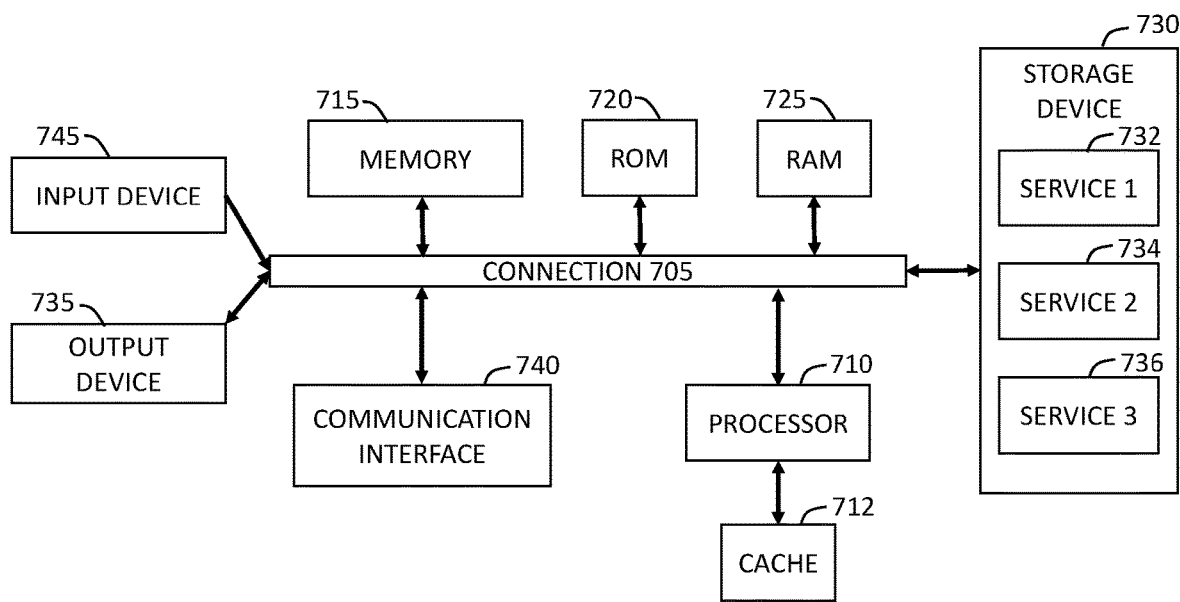
FIG. 7 shows an example embodiment of a system for implementing certain aspects of the present technology.

FIG. 7 shows an example embodiment of a computing system 700 for implementing certain aspects of the present technology. In various examples, the computing system 700 can be any computing device making up the onboard computer 104, the central computing system 502, or any other computing system described herein. The computing system 700 can include any component of a computing system described herein which the components of the system are in communication with each other using connection 705. The connection 705 can be a physical connection via a bus, or a direct connection into processor 710, such as in a chipset architecture. The connection 705 can also be a virtual connection, networked connection, or logical connection.

In some implementations, the computing system 700 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 700 includes at least one processing unit (CPU or processor) 710 and a connection 705 that couples various system components including system memory 715, such as read-only memory (ROM) 720 and random access memory (RAM) 725 to processor 710. The computing system 700 can include a cache of high-speed memory 712 connected directly with, in close proximity to, or integrated as part of the processor 710.

The processor 710 can include any general-purpose processor and a hardware service or software service, such as services 732, 734, and 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction, the computing system 700 includes an input device 745, which can represent any number of input mechanisms, such as a microphone for speech, a touch-sensitive screen for gesture or graphical input, keyboard, mouse, motion input, speech, etc. The computing system 700 can also include an output device 735, which can be one or more of a number of output mechanisms known to those of skill in the art. In some instances, multimodal systems can enable a user to provide multiple types of input/output to communicate with the computing system 700. The computing system 700 can include a communications interface 740, which can generally govern and manage the user input and system output. There is no restriction on operating on any particular hardware arrangement, and therefore the basic features here may easily be substituted for improved hardware or firmware arrangements as they are developed.

A storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as a processor 710, a connection 705, an output device 735, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for multi-modal trips in a rideshare application, comprising receiving a ride request including a pick-up location, a destination location, and a ride optimization request; generating a plurality of multi-modal trip routes including at least two modes of transportation and a transfer location; identifying a subset of trips from the plurality of multi-modal trip routes that fulfill the ride optimization request; and presenting at least one of the subset of trips via a rideshare application.

Example 2 provides a method according to one or more of the preceding and/or following examples, wherein generating the plurality of multi-modal trips includes generating multi-modal trips including a plurality of trip legs, and wherein at least one of the plurality of trip legs includes a personal mobility vehicle as one of the two modes of transportation.

Example 3 provides a method according to one or more of the preceding and/or following examples, wherein the at least two modes of transportation include an autonomous vehicle and a personal mobility vehicle, and further comprising tracking a location and a state of charge of the personal mobility vehicle.

Example 4 provides a method according to one or more of the preceding and/or following examples, further comprising providing storage and charging for the personal mobility vehicle in the autonomous vehicle.

Example 5 provides a method according to one or more of the preceding and/or following examples, further comprising selecting the autonomous vehicle that includes a personal mobility vehicle stored thereon for driving to the pick-up location.

Example 6 provides a method according to one or more of the preceding and/or following examples, wherein the ride optimization request is one of a fastest trip request and a cheapest trip request.

Example 7 provides a method according to one or more of the preceding and/or following examples, further comprising generating a price for the at least one of the subset of trips, and wherein presenting the at least one of the subset of trips includes presenting the price.

Example 8 provides a system for multi-modal trips, comprising: a central computing system including a routing coordinator configured to: receive a ride request for a multi-modal trip including a pick-up location and a destination location, generate a route from the pick-up location to the destination location including a transfer location and at least two modes of transportation, and select an autonomous vehicle for driving at least a part of the route, wherein the autonomous vehicle is one of the at least two modes of transportation; and an onboard computing system on the autonomous vehicle configured to direct the autonomous vehicle to: pick up a passenger at one of the pick-up location and the transfer location; and drop off the passenger at one of the transfer location and the destination location.

Example 9 provides a system according to one or more of the preceding and/or following examples, wherein one of the at least two modes of transportation is a personal mobility vehicle.

Example 10 provides a system according to one or more of the preceding and/or following examples, wherein the personal mobility vehicle is one of a scooter, a bicycle, a skateboard, a hoverboard, a onewheel, an electric scooter, an electric bicycle, and an electric skateboard.

Example 11 provides a system according to one or more of the preceding and/or following examples, further comprising a battery on the autonomous vehicle, wherein the autonomous vehicle is configured to provide charge from the battery to the personal mobility vehicle.

Example 12 provides a system according to one or more of the preceding and/or following examples, wherein when the autonomous vehicle picks up the passenger at the pick-up location, the routing coordinator is further configured to select an autonomous vehicle with the personal mobility vehicle stored thereon.

Example 13 provides a system according to one or more of the preceding and/or following examples, wherein the routing coordinator is further configured to receive an optimization request with the ride request and identify the route that fulfills the optimization request.

Example 14 provides a method for multi-modal trips in a rideshare application, comprising: receiving a ride request including a pick-up location and a pick-up transportation mode, a transfer location and a transfer transportation mode, and a destination location; picking up a passenger at one of the pick-up location and the transfer location; and dropping off the passenger at one of the transfer location and the destination location; wherein the pick-up transportation mode is different from the transfer transportation mode.

Example 15 provides a method according to one or more of the preceding and/or following examples, wherein picking up the passenger at the pick-up location includes picking up the passenger in an autonomous vehicle that includes a personal mobility vehicle stored thereon.

Example 16 provides a method according to one or more of the preceding and/or following examples, wherein dropping off the passenger includes dropping off the passenger and the personal mobility vehicle.

Example 17 provides a method according to one or more of the preceding and/or following examples, wherein receiving the pickup transportation mode and the transfer transportation mode includes receiving a request for a personal mobility vehicle.

Example 18 provides a method according to one or more of the preceding and/or following examples, further comprising tracking, at a central computing system, a location of the personal mobility vehicle and a level of charge of the personal mobility vehicle.

Example 19 provides a method according to one or more of the preceding and/or following examples, further comprising generating a route including the pick-up location, the transfer location, and the destination location.

Example 20 provides a method according to one or more of the preceding and/or following examples, further comprising generating a price for the route, and presenting the route and the price in the rideshare application.

Example 21 provides a system for providing multi-modal trips in an autonomous vehicle fleet, comprising a plurality of autonomous vehicles, a plurality of personal mobility vehicles, and a central computer in communication with the plurality of autonomous vehicles, comprising a routing coordinator configured to receive a ride request for a multi-modal trip including a pick-up location and a destination location, generate a route from the pick-up location to the destination location including a transfer location and at least two modes of transportation, select an autonomous vehicle for driving at least a first part of the route, wherein the autonomous vehicle is one of the at least two modes of transportation, and select a personal mobility vehicle for driving at least a second part of the route, wherein the personal mobility vehicle is one of the at least two modes of transportation.

Example 22 provides a system according to one or more of the preceding and/or following examples, further comprising an onboard computing system on the autonomous vehicle configured to direct the autonomous vehicle to: pick up a passenger at one of the pick-up location and the transfer location; and drop off the passenger at one of the transfer location and the destination location.

Example 23 provides a method for multi-modal trips in a rideshare application, comprising: receiving a ride request from a user account including a pick-up location and a destination location; picking up a passenger at the pick-up location in an autonomous vehicle that contains a personal mobility vehicle; dropping off the passenger; detecting removal of the personal mobility vehicle from the autonomous vehicle; and associating usage of the personal mobility vehicle with the user account.

Example 24 provides a method according to one or more of the preceding and/or following examples, wherein dropping off the passenger includes dropping off the passenger before reaching the destination location.

Example 25 provides a method according to one or more of the preceding and/or following examples, wherein dropping off the passenger includes dropping off the passenger at the destination location.

Example 26 provides a method according to one or more of the preceding and/or following examples, wherein the autonomous vehicle is one of a driverless car, a driverless van, and a driverless bus.

Example 27 provides a method according to one or more of the preceding and/or following examples, wherein the personal mobility vehicle is one of a scooter, an electric scooter, a bicycle, and an electric bicycle.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for multi-modal trips in a rideshare application, comprising:
receiving a ride request including a pick-up location, a destination location, and a ride optimization request;

generating a plurality of multi-modal trip routes including at least two modes of transportation and a transfer location, wherein the at least two modes of transportation include a first autonomous vehicle and a personal mobility vehicle;

identifying a subset of trips from the plurality of multi-modal trip routes that fulfill the ride optimization request;

presenting at least one of the subset of trips via a rideshare application;

receiving a multi-modal trip selection from the at least one of the subset of trips;

selecting the first autonomous vehicle for driving to the pick-up location;

identifying a second autonomous vehicle having the personal mobility vehicle onboard, wherein the second autonomous vehicle is configured to dock to the first autonomous vehicle and transfer the personal mobility vehicle to the first autonomous vehicle; and controlling the first autonomous vehicle to drive to the pick-up location.

2. The method of claim 1, further comprising tracking a location and a state of charge of the personal mobility vehicle.

3. The method of claim 2, further comprising providing storage and charging for the personal mobility vehicle in the second autonomous vehicle.

4. The method of claim 1, wherein the ride optimization request is one of a fastest trip request and a cheapest trip request.

5. The method of claim 1, further comprising generating a price for the at least one of the subset of trips, and wherein presenting the at least one of the subset of trips includes presenting the price.

6. The method of claim 1, further comprising identifying a docking location, wherein the second autonomous vehicle transfers the personal mobility vehicle to the first autonomous vehicle at the docking location.

7. The method of claim 1, further comprising transferring the personal mobility vehicle from the second autonomous vehicle to the first autonomous vehicle while the first autonomous vehicle is moving.

8. A system for multi-modal trips, comprising:
a central computing system including a routing coordinator configured to:
receive a ride request for a multi-modal trip including a pick-up location and a destination location,
generate a route from the pick-up location to the destination location including a transfer location and at least two modes of transportation, wherein the at least two modes of transportation include a personal mobility vehicle, and
select a first autonomous vehicle for driving at least a part of the route, wherein the first autonomous vehicle is one of the at least two modes of transportation
identify a second autonomous vehicle having the personal mobility vehicle onboard, wherein the second autonomous vehicle is configured to dock to the first autonomous vehicle and transfer the personal mobility vehicle to the first autonomous vehicle; and
an onboard computing system on the first autonomous vehicle configured to direct the first autonomous vehicle to:
pick up a passenger at one of the pick-up location and the transfer location; and
drop off the passenger at one of the transfer location and the destination location.

9. The system of claim 8, wherein the personal mobility vehicle is one of a scooter, a bicycle, a skateboard, a hoverboard, a onewheel, an electric scooter, an electric bicycle, and an electric skateboard.

10. The system of claim 8, further comprising a battery on the second autonomous vehicle, wherein the second autonomous vehicle is configured to provide charge from the battery to the personal mobility vehicle.

11. The system of claim 8, wherein the routing coordinator is further configured to receive an optimization request with the ride request and identify the route that fulfills the optimization request.

12. The system of claim 8, wherein the onboard computing system is further configured to:
receive a passenger request during the first autonomous vehicle route and before the transfer location to stop the first autonomous vehicle at an impromptu location, allowing passenger exit; and
providing the passenger with the personal mobility vehicle at the impromptu location.

13. The system of claim 8, wherein the routing coordinator is further configured to identify a docking location, wherein the second autonomous vehicle transfers the personal mobility vehicle to the first autonomous vehicle at the docking location.

14. The system of claim 13, wherein the second autonomous vehicle is configured to transfer the personal mobility vehicle to the first autonomous vehicle while the first autonomous vehicle is moving.

15. A method for multi-modal trips in a rideshare application, comprising:
receiving a ride request including a pick-up location and a pick-up transportation mode, a transfer location and a transfer transportation mode, and a destination location, wherein the pick-up transportation mode is a first autonomous vehicle;
selecting the first autonomous vehicle for driving to the pick-up location;
identifying a second autonomous vehicle having a personal mobility vehicle onboard, wherein the second autonomous vehicle is configured to dock to the first autonomous vehicle and transfer the personal mobility vehicle to the first autonomous vehicle;
controlling the first autonomous vehicle to drive to the pick-up location;
picking up a passenger at the pick-up location; and
dropping off the passenger at one of the transfer location and the destination location;
wherein the pick-up transportation mode is different from the transfer transportation mode.

16. The method of claim 15, wherein dropping off the passenger includes dropping off the passenger and the personal mobility vehicle.

17. The method of claim 15, wherein receiving the transfer transportation mode includes receiving a request for the personal mobility vehicle.

18. The method of claim 17, further comprising tracking, at a central computing system, a location of the personal mobility vehicle and a level of charge of the personal mobility vehicle.

19. The method of claim 15, further comprising generating a route including the pick-up location, the transfer location, and the destination location.

20. The method of claim 19, further comprising generating a price for the route, and presenting the route and the price in the rideshare application.

\* \* \* \* \*